United States Patent [19]

Will

[11] Patent Number: 5,346,759

[45] Date of Patent: Sep. 13, 1994

[54] DECKING STRUCTURE

[75] Inventor: Robert J. Will, New Hanover, N.C.

[73] Assignee: The BFGoodrich Company, Akron, Ohio

[21] Appl. No.: 888,934

[22] Filed: May 26, 1992

[51] Int. Cl.$^5$ .................. B32B 17/00; B32B 25/00
[52] U.S. Cl. .................... 428/329; 428/323; 428/325; 428/517; 428/521; 428/921
[58] Field of Search ............ 428/500, 516, 521, 517, 428/921, 323, 329, 325

[56] References Cited

U.S. PATENT DOCUMENTS 4,596,734 7/1986 Kramer ........................ 428/213
4,679,517 7/1987 Kramer ........................ 114/45

Primary Examiner—Edith Buffalow
Attorney, Agent, or Firm—Richard A. Romanchik

[57] ABSTRACT

A decking structure 30 includes a bottom layer 16 of UHMWP, an elastomeric layer 18 disposed on the bottom layer, an intermediate UHMWP layer 22 disposed on the elastomeric layer, and a top UHMWP layer 24 abrasive particles and having a pattern 32 provided therein by increasing the traction thereof. A pattern of cavities is provided in the elastomeric layer 18 and the bottom layer 16 for improving the shock absorption capabilities of the decking structure 30.

17 Claims, 5 Drawing Sheets

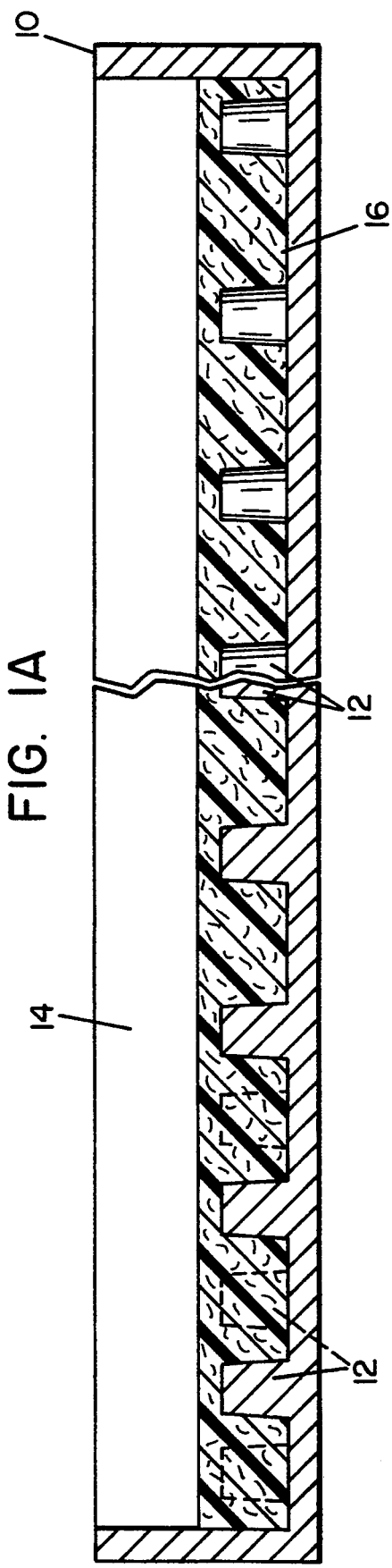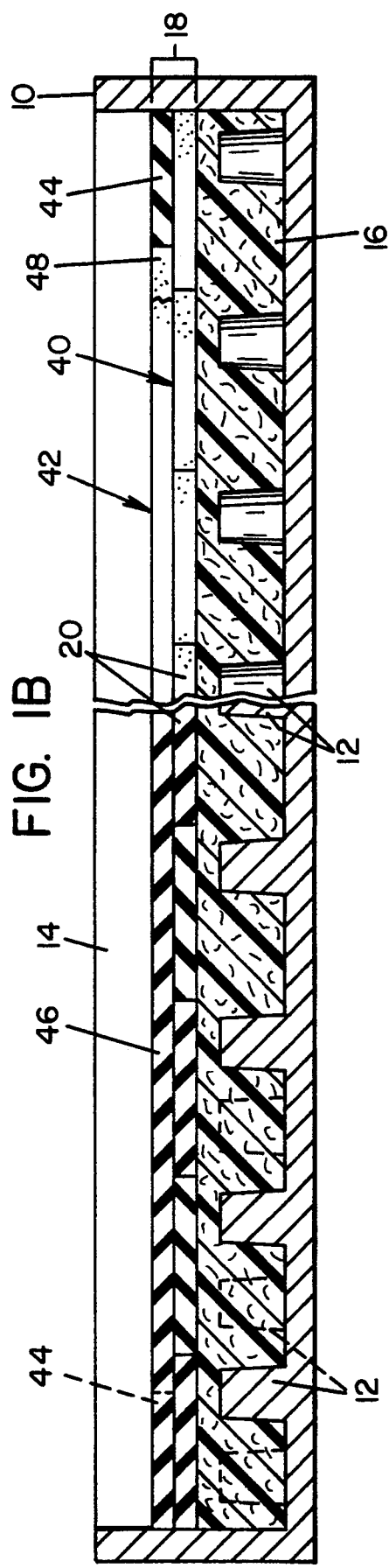

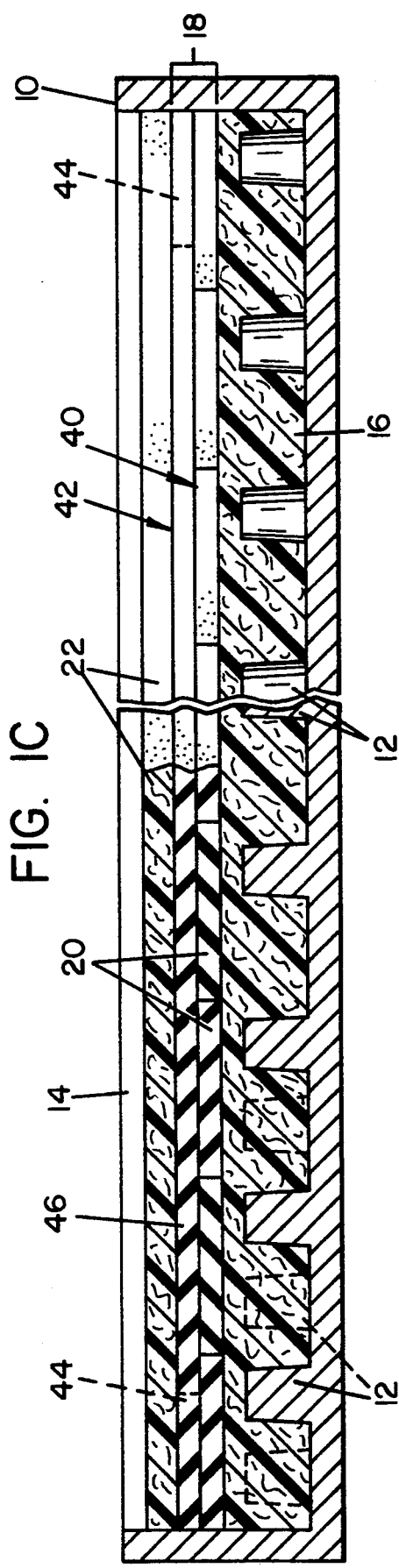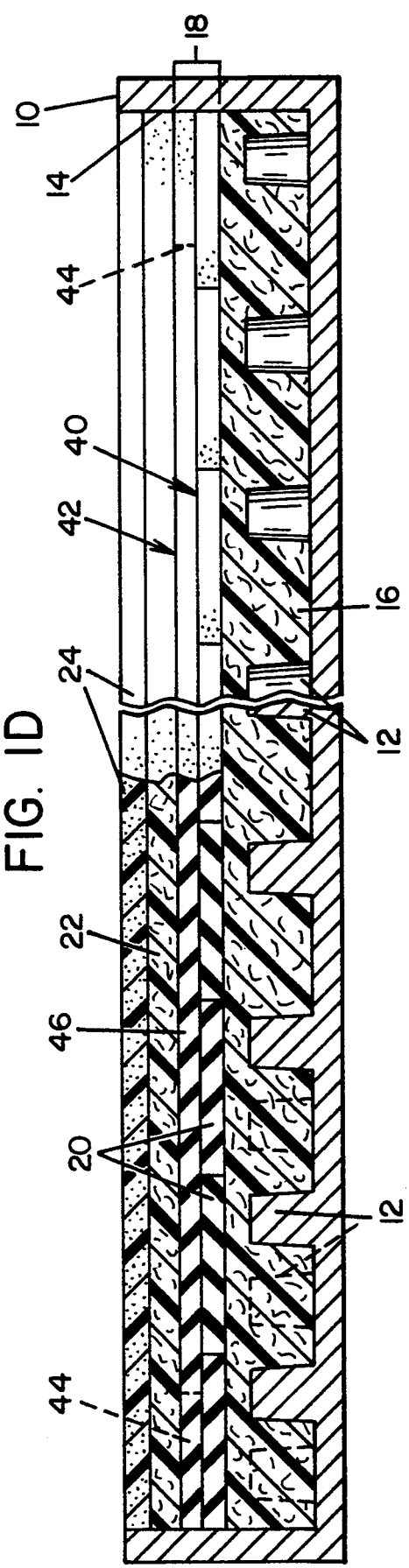

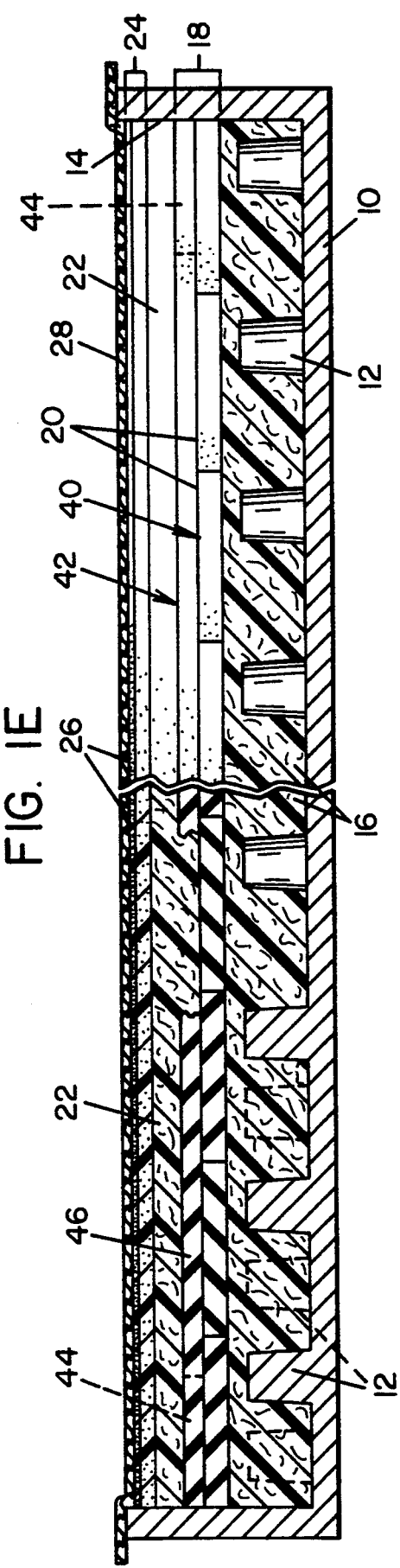
FIG. IE
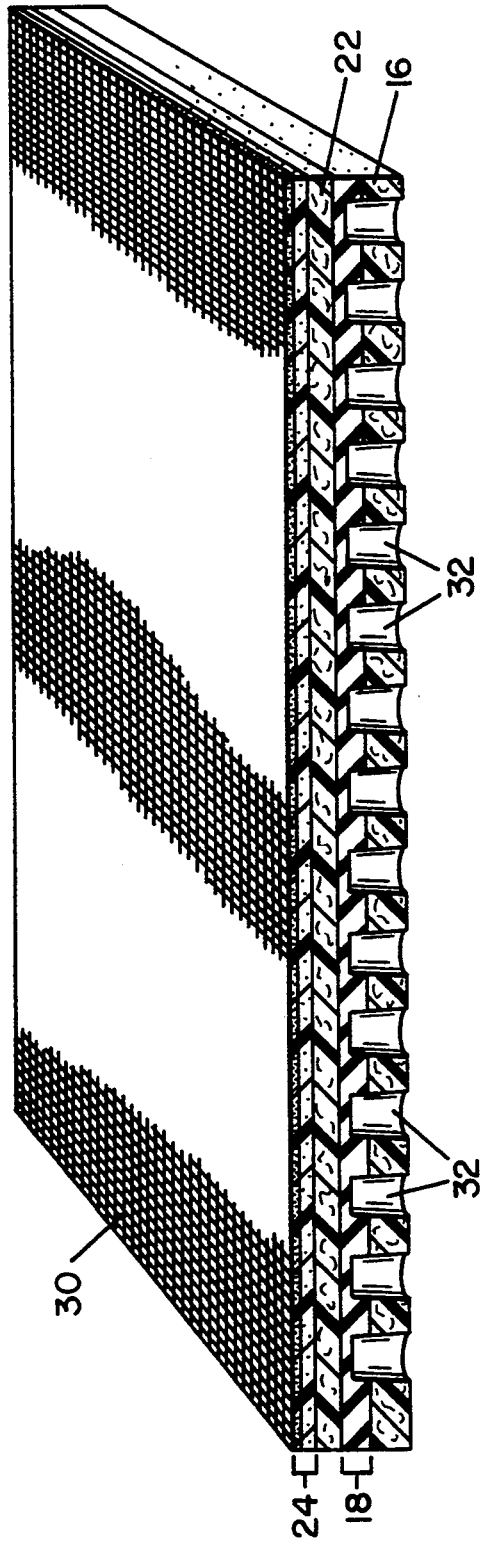
FIG. 2

DECKING STRUCTURE

TECHNICAL FIELD

This invention relates to decking material and more particularly, to an improved decking structure made from an ultra high molecular weight polyethylene composite.

BACKGROUND ART

Ship decks in the past have typically been made up of either metal or wood. Metal decking requires lower maintenance than wood decking and is typically utilized in areas which do not have a great deal of industrial type traffic involving moving of heavy machinery and the like. Wood decking on the other hand, is higher maintenance than metal decking but provides a certain amount of elasticity in the event of heavy machinery being dropped on the decking or collisions with industrial type products. Typically though, upon the impact of heavy equipment, wood splinters or cracks thereby requiring replacement. Both wood and metal decking material are susceptible to a large amount of decay due to the ocean environment, and therefore require constant upkeep with regard to painting and other maintenance activities. Another drawback to both wood and metal decking material is the fact that both become extremely slippery when they get wet. Since this condition is unavoidable on ships, measures must be taken to condition the decking material in order to provide a non-slip type surface. Prior treatment techniques have been marginally effective however, because metal and wood are relatively impermeable to any treatment which requires absorption into the material for effectiveness. Treatments used in the past on wood or metal decks therefore wear off very quickly.

A decking material which overcomes the above-identified deficiencies of metal and wood decking is therefore highly desirable.

DISCLOSURE OF THE INVENTION

The object of the present invention is to provide an improved, non-slip composite for use as decking material.

According to the present invention, an improved decking material is comprised of a bottom layer of a fire retardant UHMWP alloy, a second layer disposed on the bottom layer comprised of an elastomer, a third layer disposed on the second layer comprised of UHMWP impregnated with glass fibers, and a top layer disposed on the third layer of UHMWP impregnated with aluminum oxide particles. A pattern is transferred into the top layer to thereby provide a non-slip surface which allows for water drainage.

The present invention provides for an improved decking construction having good traction for people walking thereon. The present invention is non-corrosive, abrasion resistant, and fire retardant. It is also easily installable and light weight compared with previous decking structures.

These and other objects, features and advantages of the present invention will become more apparent in light of the detail of the detailed description of exemplary embodiments thereof as illustrated by the drawings.

BRIEF DESCRIPTION OF THE DRAWINGS

FIGS. 1A–1E are cross-sectional views of pre-molded structures resultant from the steps of building a decking structure in accordance with the present invention.

FIG. 2 is a cross-sectional, isometric view of a completed decking structure in accordance with the present invention.

BEST MODE FOR CARRYING OUT THE INVENTION

Figure 3A:
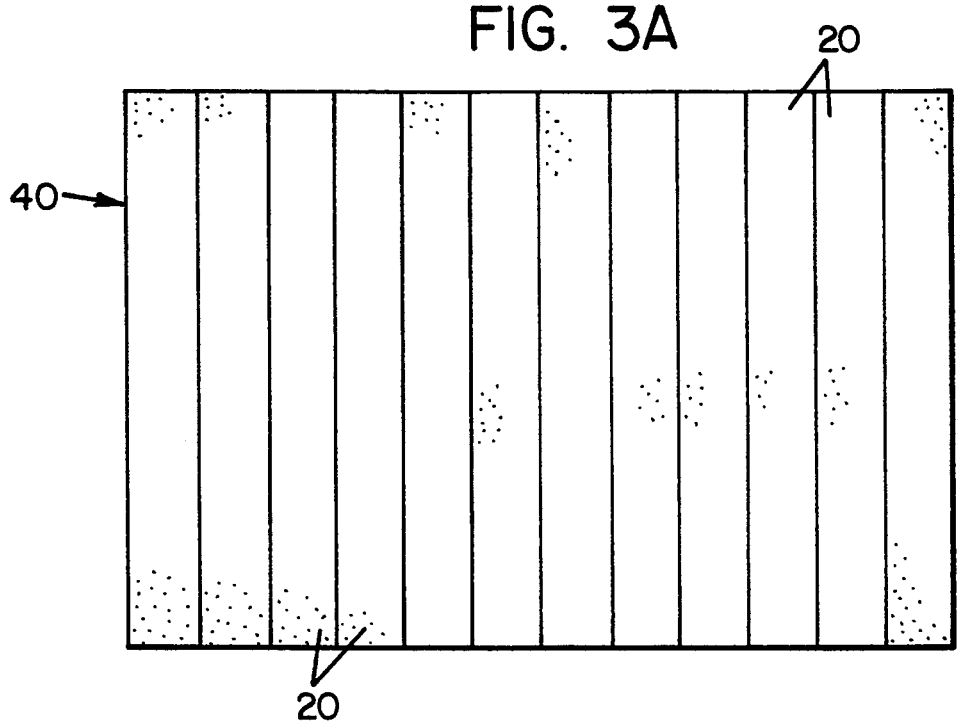
FIGS. 3A–3B are top views of two elastomeric patterns comprising the pre-molded elastomeric layer of a decking structure in accordance with the present invention.

Referring now to FIG. 1A, a mold 10, having a cavity 14, is provided for manufacturing a decking structure in accordance with the present invention. A plurality of pins 12, having a circular cross-section, protrude from the bottom of the mold cavity 14. The preferred pattern for the arrangement of pins 12 will be described in greater detail hereinafter. For the purposes of the present discussion of the preferred embodiment of the present invention, mold 10 is rectangular in shape, having a cavity 14 approximately 4 ft. by 6 ft. by 6½ inches deep. The preferred pins 12 have an approximate 2 inch diameter at the bottom, with a 3° taper to thereby have an approximate 1.75 diameter at the top. The pins 12 have a preferred height of about 2.25 inches. The preferred number of pins for mold 10 is about 360. It is to be noted however, that different shaped, and sized molds and pins may also be utilized to make different shaped decking structures. Mold 10 may be manufactured from any of a number of materials well known in the art for the manufacture of elastomer products. For instance mold 10 may be manufactured from aluminum or steel.

Before adding materials into mold 10 for processing thereafter, the interior surfaces of the mold 10 for containing the decking structure should be sprayed or coated with a mold release, such as catalog no. RTC 9110, manufactured by Chem-Trend, in a manner well known in the art.

After spraying the mold with mold release, a mixture of ultra high molecular weight polyethylene (UHMWP) and other ingredients combined according to the 10 quantities listed in Column 1 of Table A shown below, is poured into the mold 10.

TABLE A

|  | Column 1 | Column 2 | Column 3 |
| --- | --- | --- | --- |
| UHMWP | 73.4 lbs | 86.0 lbs | 46.6 lbs |
| Fiberglass | 20.0 lbs | 24.0 lbs | 0 lbs |
| Fire Retardant | 23.2 lbs | 24.0 lbs | 12.4 lbs |
| Aluminum Oxide | 0 lbs | 0 lbs | 42.0 lbs |

The ingredients in Column 1 of Table A include: ultra high molecular weight polyethylene (UHMWP) powder, such as catalog no. GUR 413 manufactured by the Hoechst Celanese Corp.; fiberglass particles such as catalog no. 1156 manufactured by the Pittsburgh Plate and Glass Corp. "PPG"; and, flame retardant powder such as the brand name EXOLIT, which is a registered trademark of the Hoechst Celanese Corp., catalog no. 422.

UHMWP is understood to be a polyolefine having a high molecular weight which measured by the solution viscosity method is greater than 2.5 million. Polyolefine is understood to be a polymer or copolymer of one or more mono-olefines having no more than four carbon atoms, as well as mixtures of these polymers and/or copolymers, between themselves.

The approximate quantities by weight of the ingredients listed in Column 1 of Table A are mixed thoroughly and then poured into mold cavity 14 to thereby provide a bottom UHMWP layer 16 of a first UHMWP mixture.

Referring now to FIG. 1B, next, a layer 18 of elastomer is placed on the bottom layer 16. It is preferred that elastomeric layer 18 be comprised of two distinct sublayers 40, 42 which are shown in greater detail hereinafter in FIGS. 3A and 3B. Sublayer 40 is comprised of twelve rubber strips 20 which entirely 10 cover the bottom layer 16, wherein each rubber strip 20 is approximately 0.75 inches thick, 6 inches wide and 4 feet long. Sublayer 42 is comprised of seven rubber strips arranged in a pattern (described in greater detail hereinafter in FIG. 3B) for providing a means for expansion of the elastomeric material of layer 18 when forces are placed onto the top of the decking structure during usage in order to help provide a cushioning or shock absorption function to the decking structure. The mold is then closed and the mixture is cured for approximately 5 minutes under pressure of approximately 1000 to 1500 psi at approximately 350° F.

An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like. The preferred material for elastomeric layer 18 is EPDM rubber treated with a suitable fire retardant, such as aluminum trihydrates.

Referring now to FIG. 1C, a second UHMWP mixture according to Column 2 of Table A is poured into mold cavity 14 to thereby provide an intermediate UHMWP layer 22 which is disposed on top of elastomeric layer 18. 10 Referring now to FIG. 1D, a third UHMWP mixture according to Column 3 of Table A is carefully spread or shaken into mold cavity 14 to thereby provide a top UHMWP layer 24 disposed on intermediate UHMWP layer 22. It is to be noted that column 3 of Table A further includes aluminum oxide ($Al_2O_3$) particles, such as the Blastite #12 product manufactured by Sun Belt Industries. Aluminum oxide particles are an abrasive material which improves the traction of the UHMWP when walked upon. The third UHMWP mixture must be carefully spread into the mold slowly so as not to cause the aluminum oxide particles (which are heavier than the rest of the ingredients of the third mixture) to sink to the bottom of the top UHMWP layer 24, for it is preferred to have an even distribution of aluminum oxide particles throughout this layer. Next, a sheet of mylar release film (approximate 30 gauge) is placed over top UHMWP layer 24. Layers 16, 18, 22 and 24 are thereafter cured for approximately 30 minutes under pressure of approximately 1000 to 1500 psi at approximately 350° F. The purpose of the mylar is to prevent the ingredients deposited thus far from sticking to the top of the mold after the mold is closed up.

Referring now to FIG. 1E, next, a thin coating or layer (not shown) of aluminum oxide particles identical to those described hereinbefore for Table A is spread on top of top UHMWP layer 24. This thin coating of aluminum oxide penetrates to just below the surface 26 of the top UHMWP layer 24 during subsequent processing, thereby providing additional "grit" to the decking surface for improved traction in order to provide a non-slip decking surface.

The top UHMWP layer 24 therefore has two levels of aluminum oxide concentration, with a higher concentration of aluminum oxide particles appearing from the surface 26 to just below the surface and a lower concentration of aluminum oxide particles appearing throughout the rest of the UHMWP layer 24. Preferably, the higher concentration of aluminum oxide particles exists within the top 25% of the total thickness of top UHMWP layer 24. Next, a pattern is transferred into the top layer 24 to further improve the traction of top UHMWP layer 24 and also to insure drainage of water off of the decking surface so that puddling of water does not occur. The preferred method of transferring this pattern into the top layer 24 is to place a piece of heavy, loose knit or loose weave fabric 28, such as catalog no. 8708 manufactured by Georgia Duck into the surface of top UHMWP layer 24. It is to be noted that prior to pressing the fabric 28 into the top layer 24, the fabric 28 should be sprayed with the mold release described hereinbefore for FIG. 1A, to ensure the fabric 28 can be removed from layer 24 after curing. After the fabric 28 has been placed on top of UHMWP layer 24, the mold 10 is closed, thereby pressing fabric 28 into the top UHMWP layer 24 and the structure is cured for approximately 4.5 hrs. under pressure of approximately 1000 to 1500 psi at approximately 350° F. After this curing process, the temperature of the mold is allowed to return to ambient while the pressure is maintained. The mold should be allowed to cool down for approximately 1 hr. after curing. It has been found that cooling the composite under pressure helps to prevent warping of the final article. Application of water to the outside of mold 10 is also utilized to reduce the mold cooling time to 1 hour and to prevent warping of the finished product.

If a different size mold is utilized for manufacturing a decking structure in accordance with the present invention, different quantities of materials than those quantities described hereinbefore must be utilized. Table B below lists, approximately, the preferred percentages by weight of the total weight of materials.

TABLE B

|  | Column 1 | Column 2 | Column 3 |
|---|---|---|---|
| UHMWP | 63% | 64% | 46% |
| Fiberglass | 17% | 18% | 0% |
| Fire Retardant | 20% | 18% | 12% |
| Aluminum Oxide | 0% | 0% | 42% |

It is to be noted that coloring, such as carbon black, may be utilized to change the appearance of the decking structure. A suitable carbon black material is the Cabot Monarch 700 product manufactured by Cabot, Inc.. Relatively small amounts of carbon black (on the order of 0.1 lbs to 0.4 lbs for each column of ingredients of Table A in the present example) are required to provide adequate coloring changes.

Referring now to FIG. 2, a decking structure produced in accordance with the method described hereinbefore for FIGS. 1A–1E includes a bottom plastic layer 16, an intermediate elastomeric layer 18, an intermediate plastic layer 22, and a top layer 24 having a pattern 30 transferred therein. A pattern of holes 32 (resultant from pins 12 of mold 10 of FIG. 1A) provide a means for expansion of the material of layers 16 and 18 when forces are applied to the top of the decking structure during usage in order to provide a cushioning or shock absorption function to decking structure 30.

It is to be noted that some shrinkage of the UHMWP and elastomer occurs during processing. The thicknesses of layers 16, 18, 22 and 24 of the finished product will therefore be less than the thickness of the layers before curing. In the present example, the approximate thickness of layer 16 of the finished product is 1.125 inches, layer 18 is 1.125 inches, and the combined thickness of layers 22 and 24 is approximately 1.75 inches. It is also to be noted that pin holes 32 extend predominantly into layer 18 after the aforementioned curing and molding steps due to compression of materials. The pin pattern therefore exists in the final product in both bottom layer 16 and elastomeric layer 18. In the preferred final assembly, there remains approximately 0.25 inches of elastomer above the top of pin holes 32.

Figure 3B:
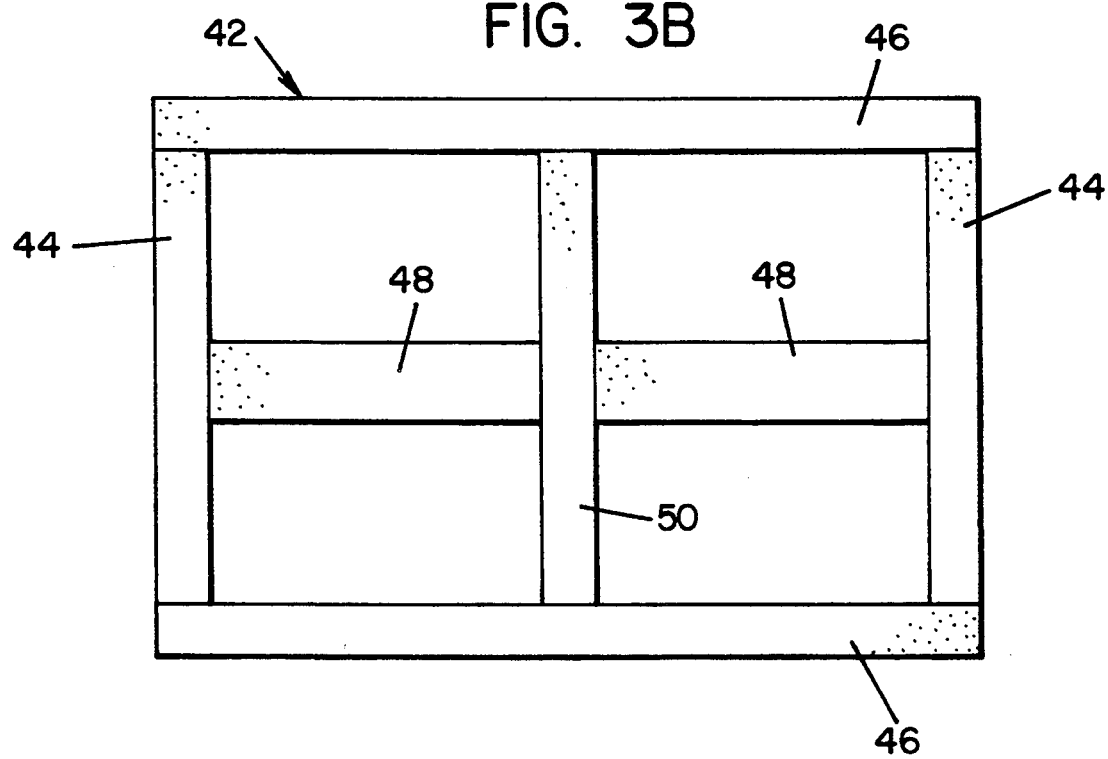

Referring now to FIGS. 3A and 3B, it is preferred that the uncured elastomeric layer 18 be comprised of two sublayers 40, 42. FIG. 3A illustrates sublayer 40, wherein a plurality of uncured elastomeric strips 40 are placed side by side to thereby cover the entire bottom layer 16. FIG. 3B, illustrates sublayer 42, wherein seven uncured elastomeric strips 44, 46, 48, 50 are arranged to have two end elastomeric strips 44, two side elastomeric strips 46, two lengthwise elastomeric middle strips 48, and one widthwise elastomeric middle strip 50. Elastomeric sublayer 42 is disposed on top of elastomeric sublayer 40 to thereby provide a means for expansion containing the UHMWP powder before curing and molding. All of the elastomeric strips 40, 44, 46, 48, and 50 are comprised of 0.75 inch thick elastomeric strips described hereinbefore for FIG. 1B. It is also preferable that end strips 44, side strips 46, and the widthwise strip 50 be approximately 4.5 inches wide and the lengthwise strips 48 be approximately 7 inches wide. Of course, other elastomeric patterns for sublayer 42 not illustrated herein may also be utilized to accomplish the shock absorption function.

Figure 4:
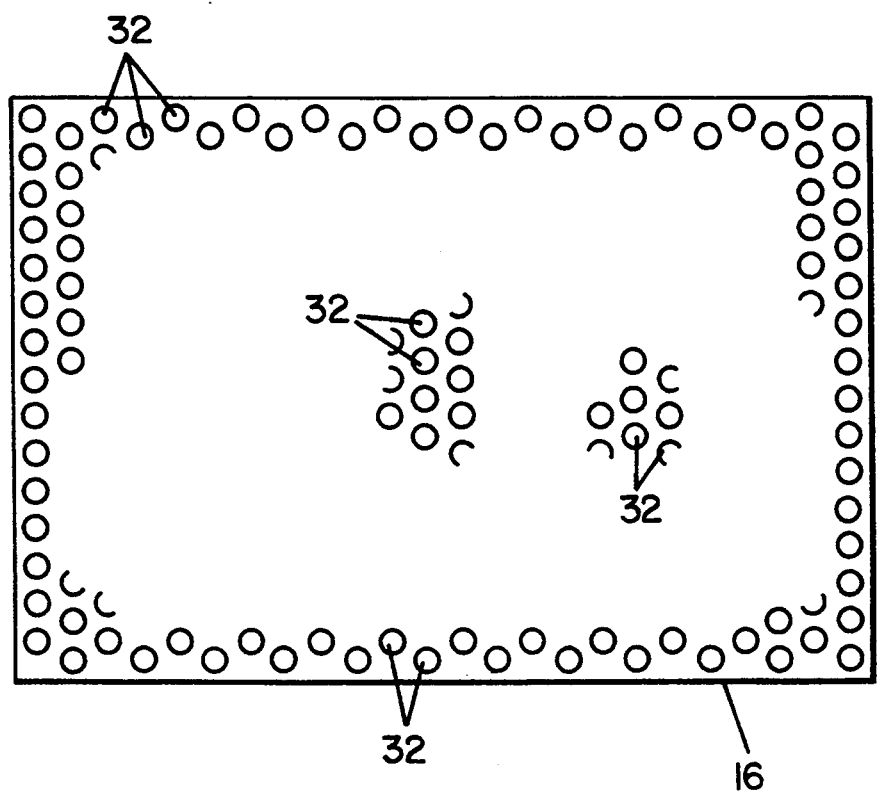
FIG. 4 is a bottom view of a completed decking structure in accordance with the present invention.

Referring now to FIG. 4, a bottom view of decking structure 30 in accordance with the present invention illustrates a plurality of holes 32 provided in the bottom UHMWP layer 16 by pins 12 of mold 10 (not shown). As discussed hereinbefore, the preferred number of holes is 360 arranged in be a "honeycomb" type pattern as shown to provide maximum shock absorption effectiveness of the bottom UHMWP layer 16. Of course, other patterns not illustrated herein may also be utilized to perform this function. The hole pattern 32 also facilitates water accumulation if water seeps below layer 16.

It is to be noted that the aluminum oxide particles distributed throughout the top UHMWP layer 24 provide a non-slick surface in the event that the upper portion of UHMWP layer 24 (having the higher concentration of aluminum oxide particles) is damaged in such a manner so as to expose the portion of the UHMWP layer 24 having the lower concentration of aluminum oxide particles. Having aluminum oxide throughout layer 24 therefore provides a "back-up" non-slip surface in the event of destruction of the top portion of the UHMWP layer 24. Although, aluminum oxide has been determined to provide superior traction enhancing capabilities, other abrasive materials not described herein, may also be suited for the same purpose.

It is also to be noted that bottom UHMWP layer 16 may be comprised of materials other than UHMWP derivatives. While UHMWP derivatives are preferable, any material which provides adequate support to layers 18, 22, 24 and bonds well to layer 18 may be utilized in order to accomplish the objectives of the present invention. To this end, layers 16 and 18 might not be necessary for certain applications.

Also, the fiberglass and fire retardants described hereinbefore and illustrated in Table A are mixed with the UHMWP in order to provide the decking structure of the present invention with superior fire retardant capabilities. The fiberglass helps prevent the UHMWP from dripping when torched, and the fire retardant helps prevent the UHMWP from flaming. Of course, other materials may be utilized to perform these functions. If, however, fire retardancy is not a design issue, the fiberglass and fire retardant would be unnecessary. Under these conditions, the bottom UHMWP layer 16 would be comprised solely of UHMWP and the top UHMWP layers 24 would be comprised of only UHMWP and aluminum oxide (with a preferred UHMWP/$Al_2O_3$ weight ratio of approximately 58/42).

The previous description for constructing a decking structure in accordance with the present invention contemplates curing previously uncured elastomers and UHMWP powder together in a mold in order to, among other things, bond the different layers 16, 18, 22, 24 together. Other methods, however, such as bonding cured elastomer and sheet UHMWP together with a suitable adhesive, may be utilized to provide a decking structure in accordance with the present invention.

Although the invention has been shown and described with exemplary embodiments thereof, it should be understood by those skilled in the art that the foregoing and various other changes, omissions, and additions may be made therein and thereto without departing from the spirit and scope of the invention.

I claim:
1. A decking apparatus comprising:
   a top layer of a first composition comprised of ultra high molecular weight polyethylene (UHMWP) and abrasive particles, said top layer having a top side and a bottom side, wherein a pattern is provided in said top side for improving the traction thereof.
2. A decking apparatus in accordance with claim 1, further comprising:
   an elastomeric layer of elastomeric material having a first side and a second side, said first side being disposed beneath said bottom side of said top layer.
3. A decking apparatus according to claim 2, further comprising:

a bottom layer of a second composition of UHMWP disposed beneath said second side of said elastomeric layer.

4. A decking apparatus according to claim 3, wherein said bottom layer has a pattern of cavities provided therein for enhancing the shock absorption capabilities thereof.

5. A decking apparatus according to claim 2, wherein said elastomeric layer has a pattern of cavities provided therein for enhancing the shock absorption capabilities thereof.

6. A decking apparatus according to claim 2, wherein said elastomeric layer is comprised of a plurality of elastomeric pieces arranged in a predetermined pattern to provide voided areas.

7. A decking apparatus according to claim 3, wherein said first and second compositions are comprised of UHMWP and a fire retardant.

8. A decking apparatus according to claim 3, wherein said first and second compositions are comprised of UHMWP and carbon black.

9. A decking apparatus according to claim 3, wherein said second composition is comprised of UHMWP and fiberglass particles.

10. A decking apparatus according to claim 1, further comprising a layer of abrasive particles disposed on said top side of said top layer.

11. A decking apparatus according to claim 1, wherein said abrasive particles are comprised of aluminum oxide.

12. A decking apparatus according to claim 1, wherein said top layer is comprised of:
a first layer of a third UHMWP composition comprised of UHMWP, fiberglass particles, carbon black, and a fire retardant; and,
a second layer disposed on said first layer of a fourth UHMWP composition comprised of UHMWP, aluminum oxide particles, carbon black and a fire retardant.

13. A decking apparatus according to claim 12 wherein
said third UHMWP composition is comprised of by weight, on the order of 64% UHMWP, 18% fiberglass particles, and 18% fire retardant and,
said fourth UHMWP composition is comprised of by weight, on the order of 46% UHMWP, 12% fire retardant particles, and 42% aluminum oxide particles.

14. A decking apparatus according to claim 1, wherein said top layer is comprised of by weight, on the order of 46% UHMWP, 12% fire retardant, and 42% aluminum oxide particles.

15. A decking apparatus comprising:
a bottom layer of a first composition comprised of ultra high molecular weight polyethylene (UHMWP) having a first pattern of cavities provided therein for enhancing the shock absorption capabilities thereof;
an elastomeric layer of elastomeric material disposed on said bottom layer and having a second pattern of cavities provided therein for enhancing the shock absorption capabilities thereof; and,
a top layer of a second composition comprised of UHMWP and abrasive particles, said top layer having a third pattern provided therein for improving the traction thereof.

16. A decking apparatus according to claim 15, wherein said abrasive particles are comprised of aluminum oxide.

17. A decking apparatus according to claim 15, wherein said top layer is comprised of by weight, on the order of 46% UHMWP, 12% fire retardant, and 42% aluminum oxide particles.

* * * * *